(12) United States Patent
Nagashima et al.

(10) Patent No.: US 6,750,929 B2
(45) Date of Patent: Jun. 15, 2004

(54) LIQUID CRYSTAL DISPLAY DEVICE (75) Inventors: Yoshikuni Nagashima, Isumi (JP); Takanori Yano, Chounan (JP)

(73) Assignees: Hitachi, Ltd., Tokyo (JP); Hitachi Electronic Devices Co., Ltd., Mobara (JP)

( * ) Notice: Subject to any disclaimer, the term of this patent is extended or adjusted under 35 U.S.C. 154(b) by 0 days.

(21) Appl. No.: 09/983,153

(22) Filed: Oct. 23, 2001

(65) Prior Publication Data
US 2002/0051106 A1 May 2, 2002

(30) Foreign Application Priority Data

Oct. 31, 2000 (JP) ........................................ 2000-331804

(51) Int. Cl.[7] ................................................. G02F 1/13
(52) U.S. Cl. ........................ 349/110; 349/111; 349/153
(58) Field of Search ................................. 349/110, 111, 349/153

(56) References Cited

U.S. PATENT DOCUMENTS 5,739,880 A    4/1998 Suzuki et al.
5,745,202 A  * 4/1998 Yamauchi et al. .......... 349/110
5,760,856 A  * 6/1998 Yanagawa et al. ............ 349/42
6,097,457 A  * 8/2000 Kim et al. .................. 349/110
6,469,758 B2 * 10/2002 Yu .............................. 349/106

FOREIGN PATENT DOCUMENTS

EP           0 627 663 B1    3/1998

\* cited by examiner

*Primary Examiner*—James A. Dudek
(74) *Attorney, Agent, or Firm*—Antonelli, Terry, Stout & Kraus, LLP (57) ABSTRACT

A liquid crystal display device includes a pair of substrates, a liquid crystal layer sealed between main surfaces of the substrates, a sealing member formed on peripheral portions of opposing main surfaces of a pair of these substrates to fixedly secure the pair of substrates to each other and surround the liquid crystal layer, and a light shielding film formed on one of the peripheral portions of the pair of substrates opposite to the liquid crystal layer without manual application. A region on which the light shielding film is formed is overlapped on a region of the main surface of one of the pair of substrates on which the seal member is formed in a back-to-back relationship, and light shielding film is formed of polyester-based resin to which a black pigment is added.

14 Claims, 5 Drawing Sheets

LIQUID CRYSTAL DISPLAY DEVICE

BACKGROUND OF THE INVENTION

The present invention relates to a liquid crystal display device of the type used for a personal computer, a work station or the like; and, more particularly, the invention relates to a technique which is applicable to the prevention of leakage of light from a backlight unit of a liquid crystal display device.

Liquid crystal display modules of the STN (Super Twisted Nematic) type or the TFT (Thin Film Transistor) type have been widely used as display devices in notebook type personal computers or the like.

Each liquid crystal display module is constituted of a liquid crystal display panel, in which a driving circuit is arranged on a peripheral part thereof, and a backlight unit which irradiates light to the liquid crystal display panel. Such a device has been disclosed in Japanese Patent Publication No. 19474/1985 and Japanese Utility Model Laid-Open No. 22780/1992.

SUMMARY OF THE INVENTION

As one example of a liquid crystal display module of the TFT type, a liquid crystal display panel is constituted such that a filter substrate, on which color filters are formed, and a TFT substrate, on which pixel electrodes and thin film transistors (TFT) are formed, are overlapped in such a manner that opposed surfaces thereof, on which orientation films are formed, face each other in a spaced manner, and sealing members are formed around the peripheral portions of both substrates. Thereafter, a liquid crystal material is filled and sealed in the space between the two substrates.

On the other hand, a black matrix is formed on the filter substrate. This black matrix is formed in such a way that it covers the peripheries of respective pixel electrodes. Due to such a constitution, an effective display area of one pixel can be partitioned, and, hence, the profile of each pixel becomes clear, so that the contrast of the liquid crystal display device can be enhanced.

Further, this black matrix is also provided for the purpose of preventing the leakage of light which is irradiated from the backlight unit through a peripheral portion to a display surface side of the liquid crystal display panel, and so the black matrix is also formed on a region where the sealing member is formed. However, when the black matrix is formed of an organic resin, the adhesive strength between the filter substrate and the organic resin is decreased. Accordingly, for example, in a cutting step in the process of manufacture of the liquid crystal display panels, a stress is applied to a region on which the sealing member is formed, so that there has been a problem in that the black matrix is peeled off from the filter substrate in the region on which the sealing member is formed.

To cope with such a problem, for example, in Japanese Patent Laid-open No. 211473/1997 (hereinafter referred to as "literature (a)"), a portion of a black matrix, which is formed on a region where a sealing member is formed, is removed so as to form a region where the black matrix and the sealing member do not overlap each other, whereby the adhesive strength is enhanced. However, in the liquid crystal display device described in the literature (a), light irradiated from a backlight unit leaks from the region where the black matrix and the sealing member do not overlap to a surface side. To deal with this problem, on a peripheral portion of a surface of the TFT substrate, on the side which does not face the liquid crystal layer, a black light shielding tape is adhered to at least the region where the black matrix and the sealing member do not overlap, whereby the leakage of light from the backlight unit is prevented.

However, the operation to apply this black light shielding tape to the glass substrate, which constitutes the TFT substrate, is performed manually for every liquid crystal display panel; and, hence, the productivity is extremely poor, thus giving rise to the problem that the additional operation pushes up the manufacturing cost of the liquid crystal display device.

The present invention has been made to solve the above-described problem of the prior art, and it is an object of the present invention to provide a technique which can reduce the manufacturing cost of a liquid crystal display device by automatically and simply forming a light shielding film provided on a peripheral portion of one substrate which constitutes a liquid crystal display element.

The above-mentioned object, other objects and novel features of the present invention will be made more apparent the following description and the attached drawings.

A summary of typical features and aspects of the invention disclosed in the present application is as follows.

That is, the present invention is applicable to a liquid crystal display device which includes a liquid crystal layer, a first substrate which has a first surface thereof with a display region on which a plurality of pixel electrodes are arranged in a matrix array, a second substrate which has a first surface thereof arranged to face the first surface of the first substrate in an opposed manner and is overlapped on the first substrate with a liquid crystal layer disposed therebetween, and a sealing member, which is disposed between the first and second substrates at peripheral portions of the first and second substrates, surrounds a region where the liquid crystal layer exists at the outside of the display region, and fixedly secures the first substrate and the second substrate.

Also, in accordance with the present invention, a light shielding film is formed on at least one side of the peripheral portion of a second surface of the first substrate, and this light shielding film is formed of a polyester-based resin to which a black pigment is added.

In accordance with the present invention, although the light shielding film is formed such that the second surface of the first substrate includes a region where the sealing member is formed, it is preferable that the light shielding film is formed on a region of the first substrate on which a polarizer is not formed.

Further, the present invention is applicable to a liquid crystal display device which includes a liquid crystal layer, a first substrate which is formed of a transparent insulation substrate and has a first surface thereof with a display region on which a plurality of pixel electrodes are arranged in a matrix array, a second substrate which is formed of a transparent insulation substrate and has a first surface thereof arranged to face the first surface of the first substrate in an opposed manner and is overlapped to the first substrate with a liquid crystal layer disposed therebetween, and a sealing member, which is disposed between the first and second substrates at peripheral portions of the first and second substrates, surrounds a region where the liquid crystal layer exists at the outside of the display region, and fixedly secures the first substrate and the second substrate. This liquid crystal display device also has an upper-side case which covers the peripheries of the first and second substrates, has an opening portion which exposes the display region and is formed of a light shielding frame. An illumination means is formed on a second-surface side of the first substrate and irradiates light, wherein the second substrate includes a black matrix formed of a light shielding film which covers the peripheries of the pixel electrodes, the black matrix partially overlaps the sealing member to cover a region between the display region and the sealing member, and a portion which does not overlap the upper-side case exists in the black matrix which is disposed in the inside of the region where the sealing member exists.

In this case, the light-shielding-film forming region which is formed on at least one side of the peripheral portions of the first substrate includes a region on a second surface of the first substrate which is not covered with the upper-side case and the black matrix.

It is preferable that the film thickness of the light shielding film is set to 40 to 120 μm.

Further, according to one aspect of the present invention, the light shielding film is formed on one of the long sides of the first substrate and one of the short sides of the first substrate, while on the region of the first surface of the first substrate on which the light shielding film is formed, semiconductor chips which drive respective pixels which constitute liquid crystal display elements are mounted.

Still further, according to another aspect of the present invention, the polyester resin includes a copolymer of ethylene terephthalate and modified alkylene ether terephthalate, while the black pigment includes at least one of carbon black and metal-based black pigment.

Further, the light shielding film of the present invention is formed by coating a resin film, which includes at least a polyester-based resin and black pigment, on at least one side of a peripheral portion of a second surface of the first substrate using a dispenser method and hardening the resin film thereafter.

According to another aspect of the present invention, the resin film includes a polyester-based resin, a black pigment, a dispersing agent and a solvent, wherein the content of the solvent in the resin film amounts to 30 to 60 percent by weight.

According to still another aspect of the present invention, the solvent is methoxy butyl acetate.

According to still another aspect of the present invention, the resin film has a viscosity of 500 to 3000 mPa·s.

According to still another aspect of the present invention, at the time of coating the resin film using a dispenser method, the resin film is coated using a nozzle having a diameter of 16 to 24 G at a coating pressure of 0.05 to 0.3 Mpa and at a coating speed of 100 to 400 mm/s.

In contrast to conventional black light shielding tape, the light shielding film of the present invention can be formed on the second surface of the first substrate without interposing an adhesive agent between the light shielding film and the first substrate.

Further, with respect to the light shielding film of the present invention, the film material does not crumble in a powdery form and holds a tape-like continued state so that it becomes possible to continuously peel off the light shielding film.

Further, since the light shielding film can be made thinner than the polarizer, it becomes possible to suppress irregularities in the gap of the liquid crystal layer.

DETAILED DESCRIPTION OF THE PREFERRED EMBODIMENTS

Preferred embodiments of a liquid crystal display device according to a present invention will be explained in conjunction with attached drawings hereinafter.

In all of the drawings, parts which have identical functions are given the same symbols and a repeated explanation thereof will be omitted. (Basic constitution of a TFT-type liquid crystal display module to which the present invention is applicable)

Figure 1:
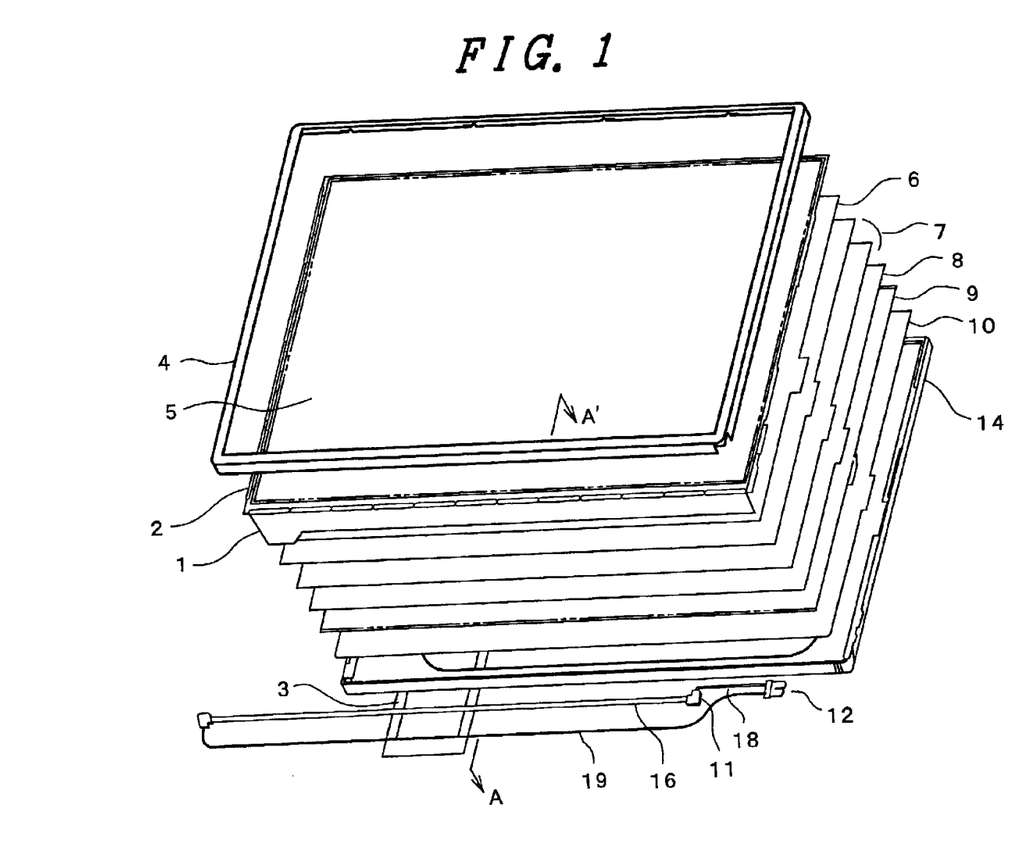
FIG. 1 is an exploded perspective view schematically showing the constitution of a TFT-type liquid crystal display module (LCM) to which the present invention is applicable.

FIG. 1 is an exploded perspective view showing the schematic constitution of a TFT-type liquid crystal display module (LCM) to which the present invention is applicable.

The liquid crystal display module (LCM) shown in FIG. 1 is constituted of a frame (an upper-side casing) 4 formed of a metal plate, a liquid crystal display panel (LCD: liquid crystal display element of the present invention) 5 and a backlight unit.

The liquid crystal display panel 5 is constituted such that a TFT substrate, on which pixel electrodes and thin film transistors (TFT) and the like are formed, and a filter substrate, on which counter electrodes and color filters are formed, are overlapped with a given gap therebetween, both substrates are adhered to each other by a frame-like sealing member which is formed in the vicinity of peripheral portions of both substrates, and liquid crystal material is filled and sealed in the inside of the sealing member defined between both substrates through a liquid crystal filling and sealing opening formed in a portion of the sealing member, and polarizers are adhered on the outside surfaces of both substrates.

Here, on a glass substrate which constitutes the TFT substrate, a plurality of drain drivers and gate drivers, which are constituted of semiconductor integrated circuit devices (IC), are mounted. A drive power supply, display data and control signals are supplied to these drain drivers through a flexible printed wiring board 1, while a drive power supply and control signals are supplied to these gate drivers through a flexible printed wiring board 2. These flexible printed wiring boards (1, 2) are connected to a drive circuit board 3, which is arranged at the rear side of the backlight unit.

Further, the liquid crystal display panel 5, on which a plurality of drain drivers and gate drivers are mounted, is arranged such that the display panel 5 is accommodated between the frame 4, which has a display window, and the backlight unit.

Here, a region on the display window of the frame 4 constitutes a display region of the liquid crystal display module (LCM) and a region other than this display region, that is, a region of the frame 4 around the display window, is usually referred to as "a picture frame".

The backlight unit of the liquid crystal display module of this embodiment is constituted such that a cold cathode ray fluorescent lamp 16, a wedge-shaped (having a trapezoidal side shape) light guide body 9, diffusing sheets 6, 8, lens sheets 7 and a reflection sheet 10 are fitted into a mold 14, which has a side wall and is formed in a frame shape in the order shown in FIG. 1.

In FIG. 1, numeral 11 indicates a rubber bushing, numeral 12 indicates a connector and numerals 18, 19 indicate cables.

Constitution of a Pixel Portion of the Liquid Crystal Display Module Shown in FIG. 1

Figure 2:
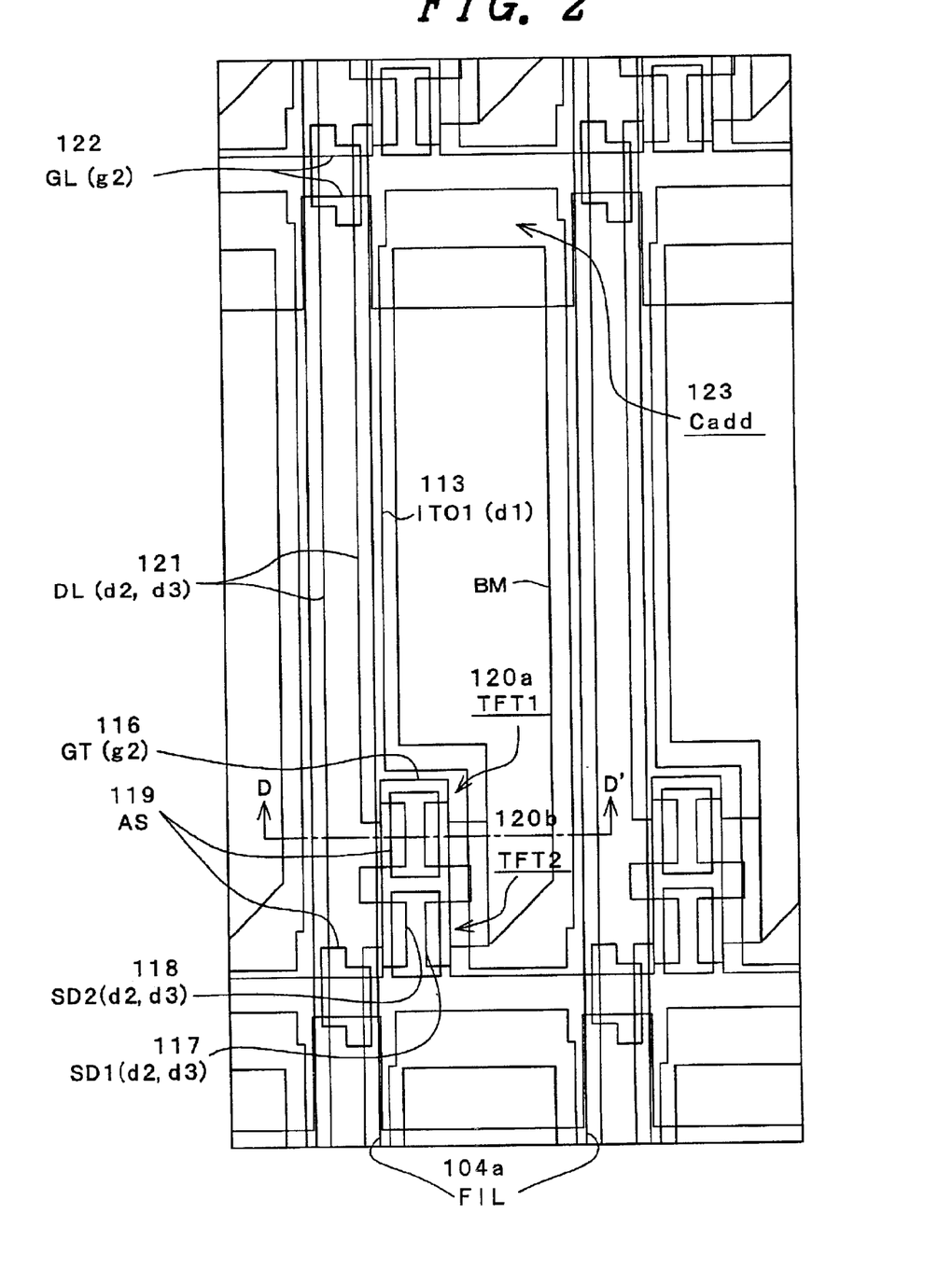
FIG. 2 is a plan view showing one pixel of the liquid crystal display module and a periphery thereof in the liquid crystal display module shown in FIG. 1.
Figure 3:
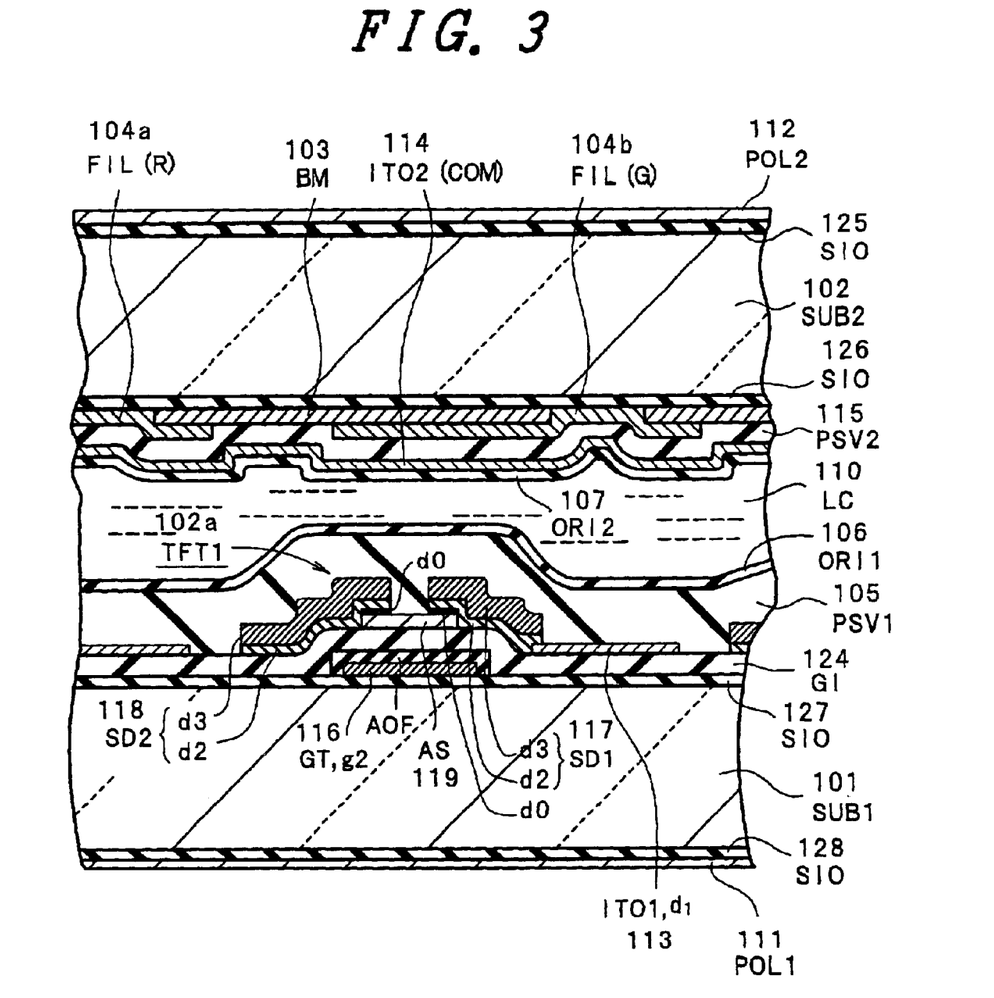
FIG. 3 is a cross-sectional view taken along a line D–D' in FIG. 2.

FIG. 2 is a plan view showing one pixel of the liquid crystal display module and the periphery thereof in the liquid crystal display device shown in FIG. 1. FIG. 3 is a cross-sectional view showing a cross section along line D–D' in FIG. 2.

In FIG. 2 and FIG. 3, a typical pixel portion includes glass substrates (SUB1, SUB2) 101 and 102, a black matrix (BM) 103, respective color filters (FIL(R) 104a, FIL(G) 104b, FIL(B) 104c) of three colors consisting of R (red), G(green) and B(blue), protective films (PSV1, PSV2) 105 and 115, orientation films (ORI1, ORI2) 106 and 107, a liquid crystal layer (LC) 110, polarizers (POL1, POL2) 111 and 112, pixel electrodes (ITO1) 113, a common electrode (IT02) 114, gate electrodes (GT) 116, source electrodes (SD1) 117, drain electrodes (SD2) 118, amorphous silicon (AS) 119, thin film transistors (TFT1, TFT2) 120a and 120b, data lines (DL) 121, gate lines (GL) 122, a holding capacitance (Cadd) 123, an insulation film (GI) 124, and oxide silicon films (SiO) 125, 126, 127 and 128.

In the liquid crystal display panel shown in FIG. 2 and FIG. 3, each pixel is arranged within a crossing region which is defined by two scanning signal lines (gate lines (GL)) and two neighboring video signal lines (date lines (DL)) (region surrounded by four signal lines). Each pixel includes two thin film transistors (120a, 120b), the pixel electrode 113 and the holding capacitance 123.

The gate lines 122 extend in the left-and-right direction and are arranged in a plural number in the up-and-down direction, as shown in FIG. 2, while the data lines 121 extend in the left-and-right direction and are arranged in a plural number in the up-and-down direction, as shown in FIG. 3.

Each thin film transistor (120a, 120b) includes the gate electrode 116, the insulation film 124, which is used as a gate insulation film, the amorphous silicon 119, the source electrode 117, and the drain electrode 118.

The gate electrode 116 is continuously and integrally formed with the gate line 122 in a form such that the gate electrode 116 protrudes in the vertical direction from the gate line 122. The gate electrode 116 and the gate line 122 are formed of a second conductive film (g2) having a single layer. Further, an anode oxide film (AOF) is formed on the gate electrode 116 and the gate line 122.

The source electrode 117 and the drain electrode 118 are formed of a second conductive film (d2) which is brought into contact with an N(+)-type semiconductor layer (d0) and a third conductive film (d3) which is formed on the second conductive film (d2). Further, the drain electrode 118 is connected to the data line 121, while the source electrode 117 is connected to the pixel electrode 113.

Further, the data line 121 is constituted of the drain electrode 118, the second conductive film (d2) which is formed on the same layer as the drain electrode 118 and the third conductive film (d3) which is formed on the second conductive film (d2), wherein the pixel electrode 113 is formed of a first transparent conductive film (d1).

In the liquid crystal display panel shown in FIG. 2 and FIG. 3, using the liquid crystal layer 110 as a reference, the thin film transistors (120a, 120b) and the pixel electrodes 113 are formed on the glass substrate 101, while the color filters (104a, 104b, 104c) and the black matrix 103 are formed on the glass substrate 102.

To the inner side (liquid crystal layer side) of the glass substrate 1021 the color filters (104a, 104b, 104c), the black matrix 103, the protective film 115, the common electrode 114 formed of a transparent conductive film and the orientation film 107 are sequentially laminated, and these elements constitute the filter substrate.

To the inner side (liquid crystal layer side) of the glass substrate 101, the gate electrode 116, the gate line 122, the insulation film 124, the amorphous silicon 119, the pixel electrode 113, the data line 121, the source electrode 117, the drain electrode 118, the protective film 105 and the orientation film 106 are sequentially laminated, and these elements constitute the TFT substrate.

Further, the polarizers (111, 112) are respectively formed on the outer sides of the glass substrates (101, 102), while the oxide silicon films (125 to 128), which are formed by the dipping processing or the like, are formed on both surfaces of each glass substrate (101, 102).

Further, although not shown in FIG. 3, spacers which establish a uniform thickness of the liquid crystal layer 110 are inserted into the liquid crystal layer 110 in a sealed manner.

Figure 4:
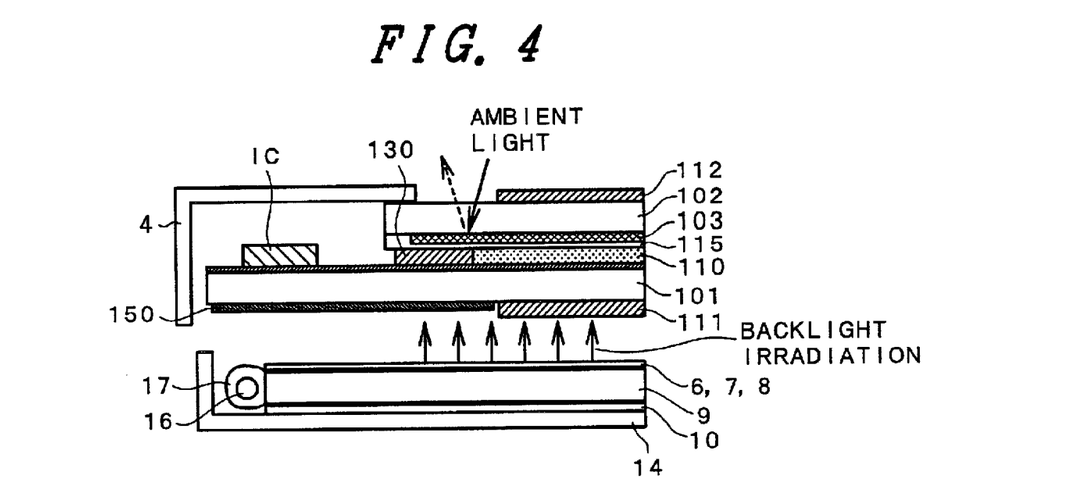
FIG. 4 is a cross-sectional view showing an example of the structure of a region on which a sealing member is formed in a liquid crystal display panel of an embodiment of the present invention, and is a view taken along a line A–A' of FIG. 1.

Features of the TFT-type Liquid Crystal Display Module of the Embodiment of the Present Invention FIG. 4 is a cross-sectional view of the structure of a region where a sealing member is formed on the liquid crystal display panel of this embodiment. FIG. 4 shows the cross-sectional structure along a line A–A' of FIG. 1.

Figure 5:
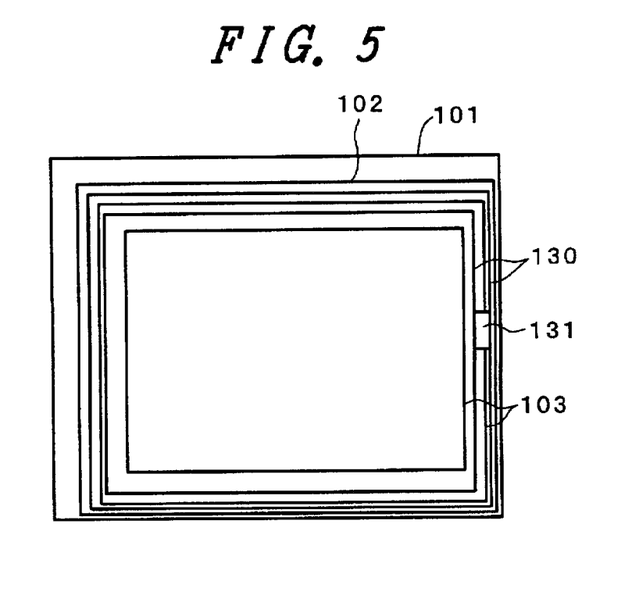
FIG. 5 is a diagram illustrating a region on which a sealing member is formed and a region on which a black matrix is formed in a liquid crystal display panel of an embodiment of the present invention.

In FIG. 4, numeral 17 indicates a lamp reflection sheet and numeral 130 indicates a sealing member. As shown in FIG. 5, the sealing member 130 is formed in a frame shape on the peripheral portion of the filter substrate and the TFT substrate, between the filter substrate and the TFT substrate, and has a liquid crystal filling opening 131 formed therein.

In FIG. 5, a region which is sandwiched by two lines identified by numeral 130 constitutes the sealing member.

In this embodiment, the black matrix 103 is, for example, constituted of an organic resin film made of acrylic resin, epoxy resin or polyimide resin to which black pigment, such as carbon black, is added.

As shown in FIG. 5, the black matrix 103 is formed so as to extend over the pixel portion to the region where the sealing member 130 is formed and partially overlaps the sealing member 130, except for the liquid crystal filling opening 131.

Due to such a constitution, according to this embodiment, the light from the backlight unit leaking through a region in the vicinity of the sealing member 130 to the display surface side can be shielded.

In FIG. 5, a region which is sandwiched by two lines identified by numeral 103 constitutes the black matrix 103, which is formed so as to extend over the pixel portion to the region where the sealing member 130 is formed. That is, the region constitutes a black matrix which is formed in a picture-frame shape over the periphery of the pixel portion.

Further, in this embodiment, the black matrix 103, which is formed of an organic film exhibiting a low adhesive strength to both the glass substrate and the sealing member 130, is partially removed along substantially the entire periphery of the sealing member 130, so as to provide portions where the black matrix 103 and the sealing member 130 do not overlap. Accordingly, at such portions where the black matrix 103 and the sealing member 130 do not overlap, the glass substrate 102, the protective film 115 and the sealing member 130 adhere to each other in this order so strongly that the adhesive strength of the sealing region can be enhanced.

Further, on a backlight-unit-side surface of the region of the glass substrate 101, where the sealing member 130 and the black matrix 103 do not overlap, a light shielding film 150 is formed.

Due to such a constitution, it becomes possible to shield the leakage of light from the backlight unit, which is a phenomenon in which light leaks from the region where the sealing member 130 and the black matrix 103 do not overlap to the display-surface side in the sealing region.

Figure 6:
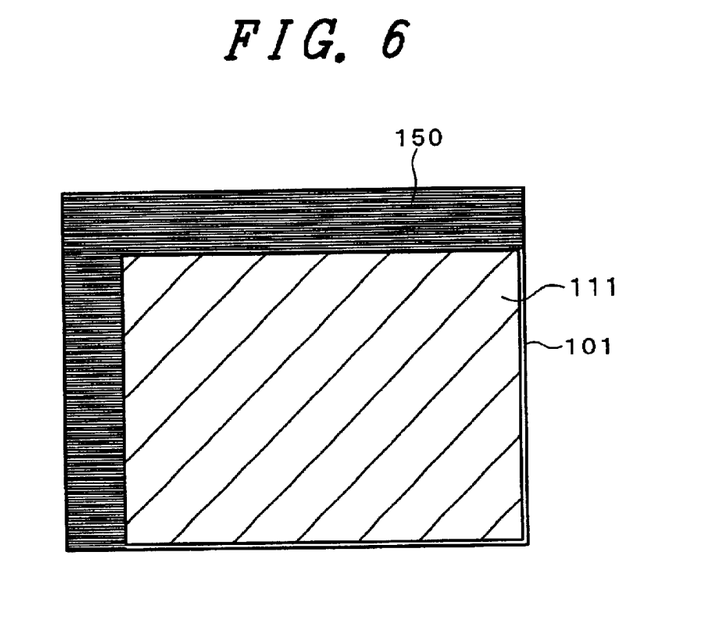
FIG. 6 is a diagram illustrating a region where a light shielding film is formed in a liquid crystal display panel of an embodiment of the present invention.

FIG. 6 is a diagram illustrating the region where the light shielding film 150 is formed in the liquid crystal display panel of this embodiment. The diagram is a view of the liquid crystal display panel as seen from the backlight unit side.

As shown in FIG. 6, the light shielding film 150 is formed on one of the long sides and one of the short sides of the glass substrate 101 at the TFT substrate side; and, as shown in FIG. 4, on the rear side (display surface side) of the region on which the light shielding film 150 is formed, semiconductor chips (IC) which constitute a drain driver and a gate driver are mounted. Here, the semiconductor chips (IC) which are mounted on one of the long sides constitute the drain driver, and the semiconductor chips (IC) which are mounted on one of the short sides constitute the gate driver.

Although the polarizer 111 is formed on the backlight-unit-side surface of the TFT-substrate-side glass substrate 101, the light shielding film 150 is formed on a region other than the region on which the polarizer 111 is formed in this embodiment.

FIG. 6 shows the case in which the light shielding film 150 is formed on the backlight-unit-side surface of the TFT-substrate-side glass substrate 101 and on the entire region on which the polarizer 111 is not formed. Accordingly, as shown in FIG. 4, in this embodiment, the light shielding film 150 is formed such that the light shielding film 150 includes the region which is not covered by the frame 4.

In this embodiment, the light shielding film 150 is, for example, formed of polyester-based resin (for example, a copolymer of ethylene terephthalate and modified alkylene ether terephthalate) to which black pigment is added.

With respect to the light shielding film 150 of this embodiment, the film material does not crumble in a powdery form and holds a continued tape-like state so that it becomes possible to continuously peel off the light shielding film in performing the peel-off operation.

Although the light shielding film 150, as will be explained later, is formed using a dispenser method, the thickness of the film (film thickness) after coating and drying can be set to 40 to 120 $\mu$m (preferably 50 to 100 $\mu$m), which is thinner than the thickness of the polarizer 111, so that it becomes possible to suppress irregularities in the gap of the liquid crystal layer.

In contrast to the black light shielding tape described in the previous-mentioned literature (a), the light shielding film 150 of this embodiment can be formed on the surface of the glass substrate 101, which constitutes the TFT substrate, using a dispenser method without interposing an adhesive agent between the glass substrate 101 and the light shielding film 150.

Accordingly, in this embodiment, it is unnecessary to perform a manual operation to adhere black tape to the substrate, as has been necessary with respect to the black light shielding tape described in the above-mentioned literature (a), and; hence, the productivity is enhanced, and, at the same time, the manufacturing cost can be reduced.

Japanese Patent. Laid-open No. 56317/2000 (referred to as "literature (b)" hereinafter) also describes a technique to form a resin film having a light shielding ability on the transparent substrate constituting the liquid crystal display panel.

This literature (b) discloses a technique in which, in a liquid crystal display panel which is constituted by laminating a pair of transparent substrates using a sealing agent having light shielding ability, in order to suppress the leakage of light at a portion where the liquid crystal composite material is filled between a pair of transparent substrates (a portion where a light shielding sealing agent is lacking or the thickness of the light shielding sealing agent is remarkably reduced), an outside light shielding film is formed on a back surface of one of a pair of transparent substrates, which corresponds to the portion where the liquid crystal composite material is filled.

However, the literature (b) fails to specify details of the material which constitutes the above-mentioned outside shielding film. In other words, with respect to the outside light shielding film of the literature (b), the possibility or idea of using the outer light shielding film in place of the light shielding tape of the literature (a) has not been taken into account. Whether the light shielding film 150 described in this embodiment exhibits the previously-mentioned properties such that the film 150 will adhere to a main surface of the glass substrate 101 with a proper strength or not, whether the light shielding film 150 is not deteriorated in a crumbled form or not, and whether the light shielding film 150 maintains a tape-like configuration or does not depend on the physical properties of the material are factors not suggested or considered in literature (b).

That is, the material of the light shielding film 150 is required to have a viscosity to allow the material to adhere to the glass substrate 101, as well as the elasticity to maintain its shape, when the material is coated on the glass substrate, against an external force (particularly, a force to peel off the light shielding film 150 from the glass substrate).

In the liquid crystal display device of the present invention, if a light shielding film 150 in the form of a viscoelastic substance is used, within a range of an environmental temperature which allows the use of the liquid crystal display device (for example, −40° C. to +60° C.), the light shielding film 150 is required to exhibit rubber-like properties.

As described, for example, on pages 14 to 20 pages (Section 2.2.1 "tacky adhesive agent as viscoelastic substance") of "Nenchaku gijutsu (tacky adhesion technique)" (The Seventh Edition, written by Keiji Fukuzawa and published by Kabushiki Kaisha Kobunshi Kankokai, 1987), the viscoelastic substance falls in a glass region when the environmental temperature is set equal to or below the glass transition temperature (Tg), in a rubber region (a region in which molecular chains which are frozen in the glass region start the movement thereof again) when the environmental temperature is set to equal to or above the glass transition temperature (Tg), and in a fluidized region (a region in which the elasticity is lost) when the environmental temperature is set to far above the glass transition temperature (Tg).

If a light shielding film 150 in the form of a viscoelastic substance, which falls in the rubber region, is used, while the light shielding film 150 will adhere to the glass substrate 101 with a suitable viscosity, the elasticity derived from the degree of freedom of movement of the molecular chains is balanced with an external force; and, hence, it becomes possible to maintain the shape of the light shielding film 150, when the film 150 is adhered to the glass substrate, against drying or peeling-off.

With respect to the liquid crystal display device of the present invention, so long as the resin material (adhesive agent) which exhibits the above-mentioned physical properties in the rubber region, at least in the temperature range (for example, 0 to +30° C.) of the atmosphere in which the liquid crystal display device is assembled, is used as the above-mentioned light shielding film 150, the resin material of the light shielding film 150 is not limited to the polyester-based resin described in this embodiment, and the same advantages can be reproduced using other resin materials.

According to the above-mentioned publication, the adhesive agent (the fixedly securing agent) usually contains an elastomer (a rubber-like elastic body), an adhesive property adding resin and a softening agent (a minute amount of aging preventing agent depending on cases).

The resin material (the adhesive agent) which constitutes the light shielding film 150 of the liquid crystal display device of the present invention includes a so-called solvent material, such as methy ethyl ketone (butanone), acetone, toluene, xylene or the like, for example, and the solvent material plays the role of the above-mentioned adhesive property adding agent or the softening agent in the resin material.

That is, even after the coating of the raw material of the light shielding film 150 on the glass substrate and the solidifying of the raw material which follows such a coating, a suitable amount of the solvent material remains inside of the light shielding film 150. Accordingly, an advantageous effect is attained in that the light shielding film 150 of the liquid crystal display device of the present invention can have a suitable adhesive property relative to the main surface of the glass substrate and it can maintain the (tape-shaped) configuration at the time of coating.

For example, in the above-mentioned embodiment, in performing a gas chromatography analysis of the composition of the material of the light shielding film 150 which is adhered to the glass substrate 101, when the height of a detected peak of the softening agent which is contained in the material of the light shielding film 150 becomes equal to or exceeds half of a detected peak of resin material, such as ethylene terephthalate, modified alkylene ether terephthalate or the like, which is contained in the material of the light shielding film 150, the light shielding film 150 brings about, not only the above-mentioned advantageous effect, but also an advantageous effect in that the light shielding film 150 can be cleanly peeled off from the glass substrate (that is, the light shielding film 150 hardly remains on the glass substrate after the peeling-off thereof).

This advantageous effect enables the repair of the liquid crystal display panel in a case where the light shielding film 150, which is non-uniformly formed on the glass substrate 101, is first peeled off and then the light shielding film 150 is coated again, whereby the yield of the production of the liquid crystal display device is remarkably enhanced.

Further, such an additional advantageous effect is not limited to the material exemplified in this embodiment. That is, by setting the physical properties of the resin material which constitutes the light shielding film 150 as described above, the additional advantageous effect can be obtained without limiting the resin material to material having a specific composition.

To facilitate the above-mentioned repairing operation of the liquid crystal display panel, it is preferable that the adhesive property (the adhesive strength) of the resin material which constitutes the light shielding film 150 of the liquid crystal display device according to the present invention is set slightly weaker than the adhesive property of the polarizer (formed by laminating a polarizing film and a phase difference film or a protective film) relative to the main surface of the glass substrate (the light shielding film 150 also being coated on the main surface). It is also preferable that the thickness of the resin material after coating and drying is set to be thinner than the thickness of the above-mentioned polarizer (including the thickness of the adhesive agent used for adhering the polarizer to the glass substrate). (Summary of a method for manufacturing the liquid crystal display panels of the embodiment of the present invention)

(i) Step 1

The filter substrate is manufactured by sequentially laminating the black matrix 103, the color filters (104a, 104b, 104c), the protective film 115, the common electrode 114 and the orientation film 107 to the glass substrate 102. In the same manner, the TFT substrate is manufactured by sequentially laminating the gate electrodes 116 and the gate lines 122, the insulation film 124, the amorphous silicon 119, the pixel electrodes 113, the data lines 121, the source electrodes 117, the drain electrodes 118, the protective film 105 and the orientation film 106 to the glass substrate 101.

(ii) Step 2

The sealing member 130 made of thermosetting epoxy resin material is formed on the peripheral portion of the filter substrate 200 and spacers are arranged inside of the sealing member 130.

(iii) Step 3

The filter substrate and the TFT substrate have the pattern surfaces thereof laminated to each other and they are heated in a state in which pressure is applied to the outer surfaces of the filter substrate and the TFT substrate so as to harden the sealing member 130, whereby the filter substrate and the TFT substrate are adhered to each other and sealed by the sealing member 130.

(iv) Step 4

The liquid crystal material is filled into the space provided between the filter substrate and the TFT substrate through the liquid crystal filling and sealing port 131 to form the liquid crystal layer 110 therebetween, then the liquid crystal filling and sealing port 131 is sealed with epoxy resin or the like, and finally the polarizers 111, 112 are adhered to the glass substrates 101, 102.

(v) Step 5

Subsequently, the resin film is formed using a dispenser method on the region in the backlight-unit-side surface of the TFT substrate (e.g. a glass substrate) 101 where the polarizer 111 is not formed, and then the film is hardened, thus forming the light shielding film 150.

Then, the semiconductor chips (IC) are mounted on the liquid crystal display panel, and, subsequently, by arranging the liquid crystal display panel on the backlight unit, which is separately produced in accordance with the arrangement relationship shown in FIG. 1, the liquid crystal display device is completed.

Figure 7:
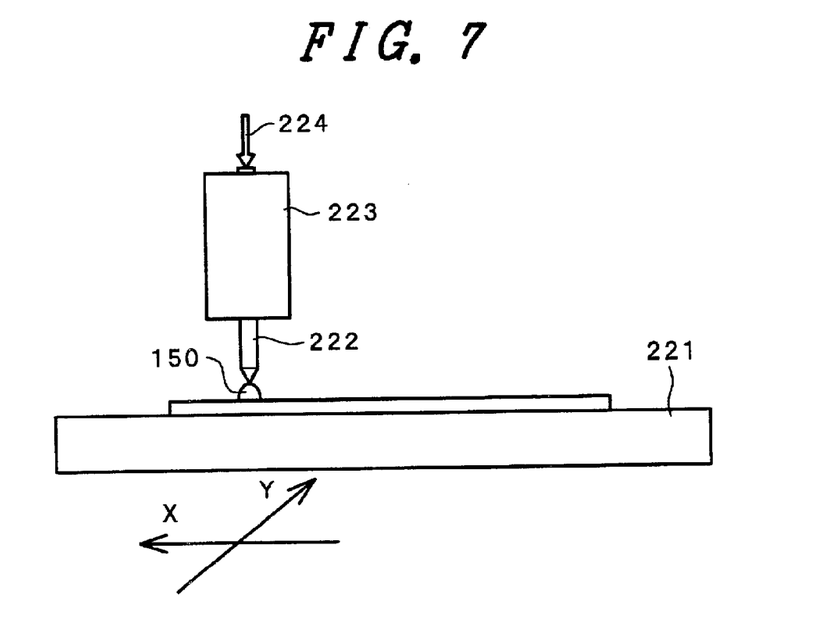
FIG. 7 is a diagram schematically illustrating a method of forming a resin film on a glass substrate at a TFT substrate side using a dispenser method.

FIG. 7 is a schematic diagram illustrating the method of forming the resin film using a dispenser method in the region which constitutes the backlight-unit-side surface of the TFT-substrate-side glass substrate 101 and on which the polarizer 111 is not formed.

In FIG. 7, numeral 221 indicates a movable base, numeral 222 indicates a nozzle, numeral 223 indicates a syringe and numeral 224 indicates high-pressure air (or nitrogen).

As shown in FIG. 7, the dispenser method is a method in which resin, which is used to form the light shielding film 150, is filled in the syringe 223, a pressure is applied to the syringe 223 using the high-pressure air (or nitrogen) 224 so as to discharge the resin from the nozzle 222 mounted on a distal end portion of the syringe 223, the liquid crystal display panel mounted on the movable base 221 or the syringe 223 is moved in X-Y directions whereby the resin film, which becomes the light shielding film 150, is coated on the region which constitutes the backlight-unit-side surface of the TFT-substrate-side glass substrate 101 and on which the polarizer 111 is not formed.

The amount of resin film which becomes the light shielding film 150 in the dispenser method depends on the viscosity of the resin which is used to form the light shielding film 150, the coating pressure, the diameter of the nozzle 222, and the moving speed of the liquid crystal display panel or the syringe 223.

In this embodiment, the resin film, which is used for the light shielding film 150, is formed under the following conditions.
(1) Viscosity of the resin which becomes the light shielding film 150: 500 to 3000 mPa·s (more preferably, 1000 to 2000 mPa·s)
(2) Diameter of the nozzle 222: 16 to 24 G (preferably 20 G)
(3) Coating pressure: 0.5 to 0.3 MPa (preferably 0.1 to 0.15 MPa)
(4) Moving speed of liquid crystal display panel or syringe 223: 100 to 400 mm/s (preferably 200 to 300 mm/s)

Further, the resin which is used for the light shielding film 150 is constituted of a polyester-based resin, a black pigment, a dispersion agent and a solvent.

Here, the polyester-based resin includes a copolymer of ethylene terephthalate and modified alkylene ether terephthalate, while the black pigment is constituted of carbon black.

The dispersion agent is constituted of an organic dispersion agent (for example, n-butyl acetate, propylene glycol mono methyl ether acetate, iso butyl alcohol or the like), while the solvent is constituted of methoxy butyl acetate.

In this embodiment, a content of the solvent amounts to 30 to 60 percent by weight (preferably 45 percent by weight).

The following advantageous effects can be obtained with the use of the light shielding film 150 of this embodiment.
(1) With respect to the light shielding film 150 of this embodiment, since the film does not crumble in a powdery form or is not partially peeled off, it becomes possible to prevent the contamination of foreign material into the inside of the liquid crystal display module.
(2) The light shielding film 150 of this embodiment is coated using a dispenser method, and the film after hardening is in a tape-like continued state so that the light shielding film 150 can be continuously peeled off.
(3) According to this embodiment, the light shielding film 150 can be formed on a region having a relatively large area. Accordingly, even when the resin which becomes the material of the light shielding film 150 is coated in an overlapped manner, since the content of the solvent is relatively large (30 to 60 percent by weight and more preferably 45 percent by weight), the film thickness of the light shielding film 150 can be limited to a value which falls in the above-mentioned range, so that the occurrence of irregularities in the gap can be prevented.

To the contrary, when the black tape described in the above-mentioned literature (a) includes an overlapped portion, the thickness of the portion becomes thicker than other portions, and hence, irregularities in the gap are liable to occur.

In the above-mentioned embodiments, a case in which carbon black is used as the black pigment which is added to the polyester-based resin has been described. However, besides carbon black, a metal-based black pigment, as cobalt oxide particles, chromium oxide particles, titanium oxide particles, also or titanium oxide nitride particles, also can be used.

Further, in the above-mentioned literature (a), there is a description to the effect that a light shielding film may be formed of a resin film to which black pigment is added. However, this literature (a) merely suggests the possibility of using the resin film to which the black pigment is added as a light shielding film. However, the literature (a) completely fails to disclose the kind of resin used as the light shielding film, the method of forming the light shielding film, the composition of the resin at the time of forming the light shielding film using the dispenser method and the like.

Further, in the above-mentioned embodiments, although the case in which the present invention is applied to a TFT-type liquid crystal display module has been mainly described, the present invention is not limited to such a case. That is, the present invention is also applicable to STN-type liquid crystal display modules.

Although the features of the present invention have been specifically explained in conjunction with the previously-mentioned embodiments, the present invention is not limited to the previously-mentioned embodiments, and it is needless to say that various modifications can be made without departing from the gist of the present invention.

The advantageous effects obtained by typical aspects of the invention disclosed in the present application are as follows.
(1) According to the liquid crystal display device of the present invention, since the light shielding film does not crumble in a powdery form or is not partially peeled off, it becomes possible to prevent the contamination of foreign material into the inside of the liquid crystal display module.
(2) According to the liquid crystal display device of the present invention, the light shielding film is in a tape-like continued state, so that the light shielding film can be continuously peeled off when the film is to be peeled off.
(3) According to the liquid crystal display device of the present invention, the film thickness of the light shielding film can be made thinner than that of the polarizer, so that the occurrence of irregularities in the gap of the liquid crystal layer can be prevented.

While we have shown and described several embodiments in accordance with the present invention, it is to be understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A liquid crystal display comprising:

a liquid crystal layer, a first substrate which has a first surface thereof with a display region on which a plurality of pixel electrodes are arranged in a matrix array, a second substrate which has a first surface thereof arranged to face the first surface of the first substrate in an opposed manner and is overlapped to the first substrate by way of a liquid crystal layer, and a sealing member which is disposed between the first and second substrates at peripheral portions of the first and second substrates, surrounds a region where the liquid crystal layer exists at the outside of the display region, and fixedly secures the first substrate and the second substrate, wherein the first substrate includes a light shielding film on at least one side of a peripheral portion of the second surface, the region on which the light shielding film is formed includes a region of a second surface of the first substrate on which the sealing member is formed, and the light shielding film is formed of polyester-based resin to which black pigment is added and is formed on the substrate without interposing an adhesive agent therebetween, wherein the polyester-based resin includes a copolymer of ethelene terephthalate and modified alkylene ether terephthalate.

2. A liquid crystal display device comprising:

a liquid crystal layer, a first substrate which has a first surface thereof with a display region on which a plurality of pixel electrodes are arranged in a matrix array, a second substrate which has a first surface thereof arranged to face the first surface of the first substrate in an opposed manner and is overlapped to the first substrate by way of a liquid crystal layer, and a sealing member which is disposed between the first and second substrates at peripheral portions of the first and second substrates, surrounds a region where the liquid crystal layer exists at the outside of the display region, and fixedly secures the first substrate and the second substrate, wherein the first substrate includes a light shielding film on at least one side of a peripheral portion of the second surface, the region on which the light shielding film is formed includes a region of a second surface of the first substrate on which the sealing member is formed, and the light shielding film is formed of polyester-based resin to which black pigment is added and is formed on the substrate without interposing an adhesive agent therebetween, wherein the black pigment includes at least one of carbon black and metal-based black pigment.

3. A liquid crystal display device which comprising:

a liquid crystal layer, a first substrate which is formed of a transparent insulation substrate and has a first surface thereof with a display region on which a plurality of pixel electrodes are arranged in a matrix array, a second substrate which is formed of a transparent insulation substrate and has a first surface thereof arranged to face the first surface of the first substrate in an opposed manner and is overlapped to the first substrate by way of a liquid crystal layer, and a sealing member which is disposed between the first and second substrates at peripheral portions of the first and second substrates, surrounds a region where the liquid crystal layer exists at the outside of the display region, and fixedly secures the first substrate and the second substrate, an upper-side case which covers peripheries of the first and second substrates, has an opening portion which exposes the display region and is formed of a light shielding frame, and illumination means which is formed on a second-surface side of the first substrate and irradiates light, wherein the second substrate includes a black matrix formed of a light shielding film which covers peripheries of the pixel electrodes, the black matrix partially overlaps the sealing member to cover a region between the display region and the sealing member, and a portion which does not overlap the upper-side case exists in the black matrix which is disposed in the inside of the region where the sealing member exists, the first substrate includes a light shielding film on at least one side of a peripheral portion of the second surface, the region on which the light shielding film is formed includes a region of a second surface of the first substrate which is not covered with the upper-side casing and the black matrix, and the light shielding film is formed of polyester-based resin to which black pigment is added and is formed on the substrate without interposing an adhesive agent therebetween.

4. A liquid crystal display device according to claim 3, wherein the first and second substrates respectively have polarizers on second surfaces thereof, and the light shielding film is formed on a region of the first substrate on which the polarizer is not formed.

5. A liquid crystal display device according to claim 3, wherein the light shielding film is formed on one of long sides of the first substrate and one of short sides of the first substrate, and on the region of the first surface of the first substrate on which the light shielding film is formed, semiconductor chips which drive respective pixels of the liquid crystal display elements are mounted.

6. A liquid crystal display device according to claim 3, wherein the polyester-based resin includes a copolymer of ethelene terephthalate and modified alkylene ether terephthalate.

7. A liquid crystal display device according to claim 3, wherein the black pigment includes at least one of carbon black and metal-based black pigment.

8. A liquid crystal display device according to claim 3, wherein the light shielding film has a film thickness of 40 to 120 $\mu$m.

9. A method for manufacturing liquid crystal display devices comprising:
- a step for preparing a first substrate having a first surface with a display region on which a plurality of pixel electrode are arranged in a matrix array,
- a step for preparing a second substrate,
- a step for forming a sealing member on a first surface of the first substrate or the second substrate at an outside of the display region except for a liquid crystal filling opening,
- a step for arranging the first substrate and the second substrate in such a manner that the first surfaces of the first and second substrates face each other in an opposed manner and adhering them in a sealing manner,
- a step for filling liquid crystal between the first and second substrate through a liquid crystal filling port and sealing the liquid crystal therebetween,
- a step for coating a resin film including at least polyester-based resin and black pigment on at least one side of a peripheral portion of a second surface of the first substrate using a dispenser method, and
- a step for forming a light shielding film of the resin film, wherein the resin film includes polyester-based resin, black pigment, a dispersing agent and a solvent, and a content of the solvent in the resin film amounts to 30 to 60 percent by weight.

10. A method for manufacturing liquid crystal display devices according to claim 9, wherein the polyester-based resin includes a copolymer of ethelene terephthalate and modified alkylene ether terephthalate.

11. A method for manufacturing liquid crystal display devices according to claim 9, wherein the black pigment includes at least either one of carbon black and metal-based black pigment.

12. A method for manufacturing liquid crystal display devices according to claim 9, wherein the solvent is methoxy butyl acetate.

13. A method for manufacturing liquid crystal display devices according to claim 9, wherein the resin film has the viscosity of 500 to 3000 mPa·s.

14. A method for manufacturing liquid crystal display devices according to claim 9, wherein at the time of coating the resin film using a dispenser system, the resin film is coated using a nozzle having a diameter of 16 to 24 G at a coating pressure of 0.05 to 0.3 Mpa and at a coating speed of 100 to 400 mm/s.

* * * * *